Jan. 19, 1965 A. V. ALEXEFF 3,166,304
HEATING MEANS FOR STRIP MATERIAL
Filed May 26, 1961 3 Sheets-Sheet 3

INVENTOR.
ALEXANDER V. ALEXEFF
BY
Attorneys

3,166,304
Patented Jan. 19, 1965

3,166,304
HEATING MEANS FOR STRIP MATERIAL
Alexander V. Alexeff, Cleveland, Ohio, assignor to Industrial Ovens, Incorporated, Cleveland, Ohio, a corporation of Ohio
Filed May 26, 1961, Ser. No. 116,645
1 Claim. (Cl. 263—3)

This invention relates to line processing of webs and strands, and particularly to means for accomplishing deep heating and precise and responsive control of the treatment of strips of material in applications where such deep heating or responsive control has not heretofore been possible or satisfactory, and to means for greatly improving the uniformity of heat application over an interface between a strip and an array of heating elements or a heating face, or the like.

For the purposes of this application, "strands" is to be understood to include monofilaments, yarns, wires, cords, narrow tapes, and ribbons, and the like; and "strips" is to be understood to include strands and also webs such as sheet metal, paper, textiles, films, both woven and unwoven fabrics, and wide tapes. In certain aspects, the invention has peculiar applicability to the treatment of metal strip.

The invention has promise in applications where deep heating of a strip is required on a continuous basis, as for example in annealing of stainless steel or aluminum, and particularly where deep heating must be accomplished without excess surface temperature. The invention also offers great advantages in applications where heating must be accomplished in an inert atmosphere. According to the invention, deep heating of the passing strip may be accomplished in an inert atmosphere without excessive surface temperatures, all in a manner which makes possible control of temperatures within close tolerances and on a continuous basis which may be governed by control means responsive to temperature, speed, tension or stretch of the web or other sensed values.

In the above mentioned heat treatment of metals, rather high temperatures may be required together with deep penetration through the thickness of the hot metal sheet or strip. For example, in the annealing of stainless steel, it may be desirable to achieve temperatures of 1200° or 1400° F. In the tinning of steel or zinc coating of steel, temperatures from 500° to 700° F. are typical. In the annealing of aluminum, temperatures of 400° to 700° F. are typical. The annealing of aluminum presents an example of the desirability of surface temperature control, particularly where color application is accomplished at the same time as the passing strip is annealed. Since the baking of the color on the surface cannot be successfully accomplished above temperatures that are relatively lower, say 400° or 500°, as compared with the internal annealing temperature required which may be somewhat above 500°, the present invention makes it possible to successfully accomplish such operations and to do so, if desired, in an inert atmosphere.

Although the invention contemplates many applications where the heating will not be in an inert atmosphere, the accomplishment of heating within such an atmosphere by radiated black bodies of steel, or by ceramic brick of the types known for radiant heating use, or other radiating bodies, may be of great significance, particularly in applications where close and responsive control of the heating is required. It has heretofore been conventional to employ electric heating means and the like in inert-atmosphere applications, but a serious disadvantage has been the relatively undesirable spectrum of the radiated energy. Electric elements, like some black bodies, tend to radiate heat energy in the lower frequency portions of the spectrum. However the present invention contemplates the employment of ceramic hot bodies or other hot bodies which have the desirable characteristic of radiating predominately in the infrared end of the heat spectrum, such bodies being heated outside the inert atmosphere and then being transported to the inert atmosphere for the strip heating operation.

In one aspect, the invention contemplates the provision of heating elements other than hot bodies, as for example, electric heating elements or the like, such arrangements being advantageous in respect of the accomplishment of heat-input uniformity along the heating interface between the heating elements area and the passing strip, and in other respects.

In another variant aspect which is particularly applicable to the use of electric or gas heating elements or the like which are not heated by a separate heat input means but which comprise heat generating elements, the invention contemplates the provision of heating apparatus where the trains of heating elements are not endless but comprise rigid or flexible arrays adjacent to a treated strip with the strip and heating elements arranged to vary the presentation area therebetween. In this aspect, the invention cannot realize many of the advantages of the endless train arrangements such as, for example, the continuous sweeping of the heating elements as well as the treated strip through the presentation area between the heating elements and the treated strip, or the employment of heat input means remote to the heat presentation area. However in this aspect the invention does have advantages as to the closeness and responsiveness of the controlled strip temperature as compared to arrangements for accomplishing such control by varying oven temperature or varying the output of the heating means. For example, a relatively close control of strip temperature may be accomplished by quick accommodation of desired changes in strip speed because it is not necessary to vary oven temperature or total output of the heating means in order to make such an accommodation.

These and other advantages and features of the invention will become apparent from the following description of embodiments of the invention. As will be apparent to those familiar with strip processing, specific mechanical, electrical or hydraulic equipment components to be employed in any given installation are a matter of choice within the routine skill of the art. Such components in each illustrated embodiment are therefore illustrated schematically or diagrammatically in the interest of clarity in order that the invention itself may be most concisely and completely described and understood.

The term "train-and-strip-path juncture" is used herein to refer to a juncture where the path of the passing strip is either divergent from or convergent with the train of heating elements.

The term "reach" herein is used in its common dictionary sense as referring to an extent, stretch or expense.

Figure 1:
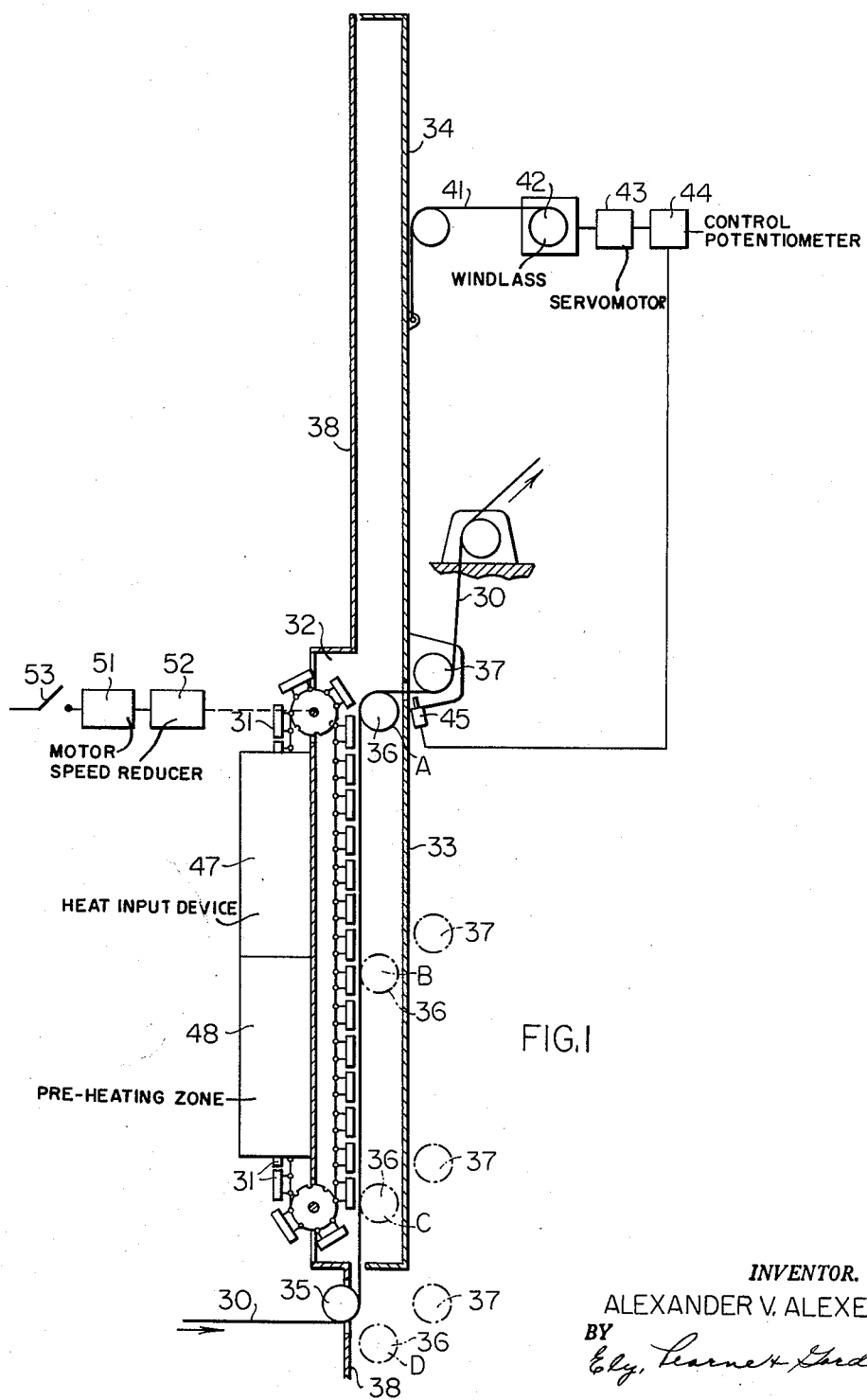
FIGURE 1 is a schematic side elevation, partly in cross-section, illustrating apparatus embodying the invention and emphasizing certain aspects thereof.

FIGURE 1 illustrates a strip processing operation which might be employed where an array of heating units in the form of an endless train is combined with means for varying distance between train-and-strip-path junctures at opposite extremes of the area of presentation between the heating elements and the strip being treated.

A train of heating elements 31 is shown in FIGURE 1 passing through a heating chamber 32. Associated with the heating chamber is a movable wall 33 having a long top extension 34 which serves to close the chamber 32 at lower positions of the apparatus, as will become clear below.

A strip 30 passes around an entering guide roll 35 and outfeed rolls 36 and 37, the outfeed roll 37 being located exteriorly to the movable wall or chamber portion 33. The rolls 36 and 37 and the movable chamber portion 33 are mounted for bodily movement together. It will be understood that as the rolls 36 and 37 and the chamber portion 33 move downwardly from the position shown in FIGURE 1, the upper portion 34 of the chamber 33 moves downwardly along the upper portion of the stationary closure wall 38 and along the length of the heating reach of the heating elements 31 to maintain the closure of the chamber 32. The lower portion of the chamber moves along the portion of the stationary closure wall 38 which depends from the chamber 32. It should be noted, however, that in some applications a chamber enclosure may not be required, and that where enclosure of the heating chamber is required, other arrangements may be provided for maintaining the closure.

It will be apparent that in FIGURE 1, the presentation area of the heating elements to the strip is defined between two train-and-strip-path junctures, one train-and-strip-path juncture occurring where the train of heating elements 31 and the lower end of the incoming strip 30 meet and the other train-and-strip-path juncture occurring at the roll 36 where the strip 30 abruptly diverges from the endless train of heating elements 31.

In the illustrated condition of the apparatus, the distance between the respective train-and-strip-path junctures (and consequently the presentation area between the heating elements and the strip) is at a maximum corresponding to the illustrated position "A" of the roll 36. When the rolls and associated moving portions of the chamber structure are lowered until the roll 36 occupies position "B" the presentation area is reduced to approximately one-half its original value. When the roll 36 reaches the position "C," the distance between the train-and-strip-path junctures is substantially zero and the presentation area is reduced to substantially zero. In the particular apparatus illustrated, the outfeed roll 36 is capable of moving even beyond the zero presentation area position to a position "D" where it may be desirable to translate the roll upon complete stoppage of the line.

In the illustrated apparatus, means for varying the distance between the above-mentioned train-and-strip-path junctures comprises a linkage 41 adapted to be taken up on and let off the windlass 42, which is adapted to be driven back and forth by a reversible servomotor 43, the total angular displacement of which is controlled by a conventional control potentiometer 44. A radiation pyrometer 45 is mounted for movement with the rolls 36 and 37, and is adapted to sense temperature of the web at the outfeed end of the heat treating station. Through the control potentiometer 44, the servomotor 43 is controlled in response to sensed temperature, so that upon increase in temperature the roll 36 is lowered and upon decrease in temperature the roll 36 is raised, the roll 36 normally hovering about an intermediate position, such as the position "B" or a position at least somewhat below the fully raised position "A."

Instead of re-lowering the movable wall 33 and rolls 36 and 37 as described above, the train 31, chamber 32, and wall portions 38 (now no longer stationary) may be raised to vary the distance between the above-mentioned train-and-strip-path junctures. If there is resulting interference with the roll 35, this roll may be eliminated and the incoming web 30 may approach the apparatus along a vertical path.

Both the above-described motions may be combined, if desired.

The heating elements 31 may comprise heat generating elements, such as electric heating elements or the like, or they may comprise ceramic or metal hot bodies. In the latter case, the hot bodies may travel through a heat input device 47, which may comprise oil burners or gas burners or the like in an oven zone. It will be understood that the train of heating elements 31 would in such a case normally rotate in a direction such that the train passes downwardly opposite to the direction of strip movement along the heating reach. The elements 31 might thence pass upwardly through a heat exchanging or recovery or pre-heating zone 48, which also would serve the function of cooling the heating elements 31. The heating elements 31 may within the zone 48 be festooned or the length of travel or the cooling effect thereon may be otherwise intensified. A drive motor 51 and speed reducer 52 may be provided for the endless train 31.

The control elements for the motor 51 may include a control switch 53 which is closed upon shutdown of the processing line to reverse the motor 51 and thereby immediately introduce cool heating elements 31 within the chamber 32 and along the heating reach. This is most appropriate to heating with hot bodies rather than heating elements of the heat generating type.

Figure 2:
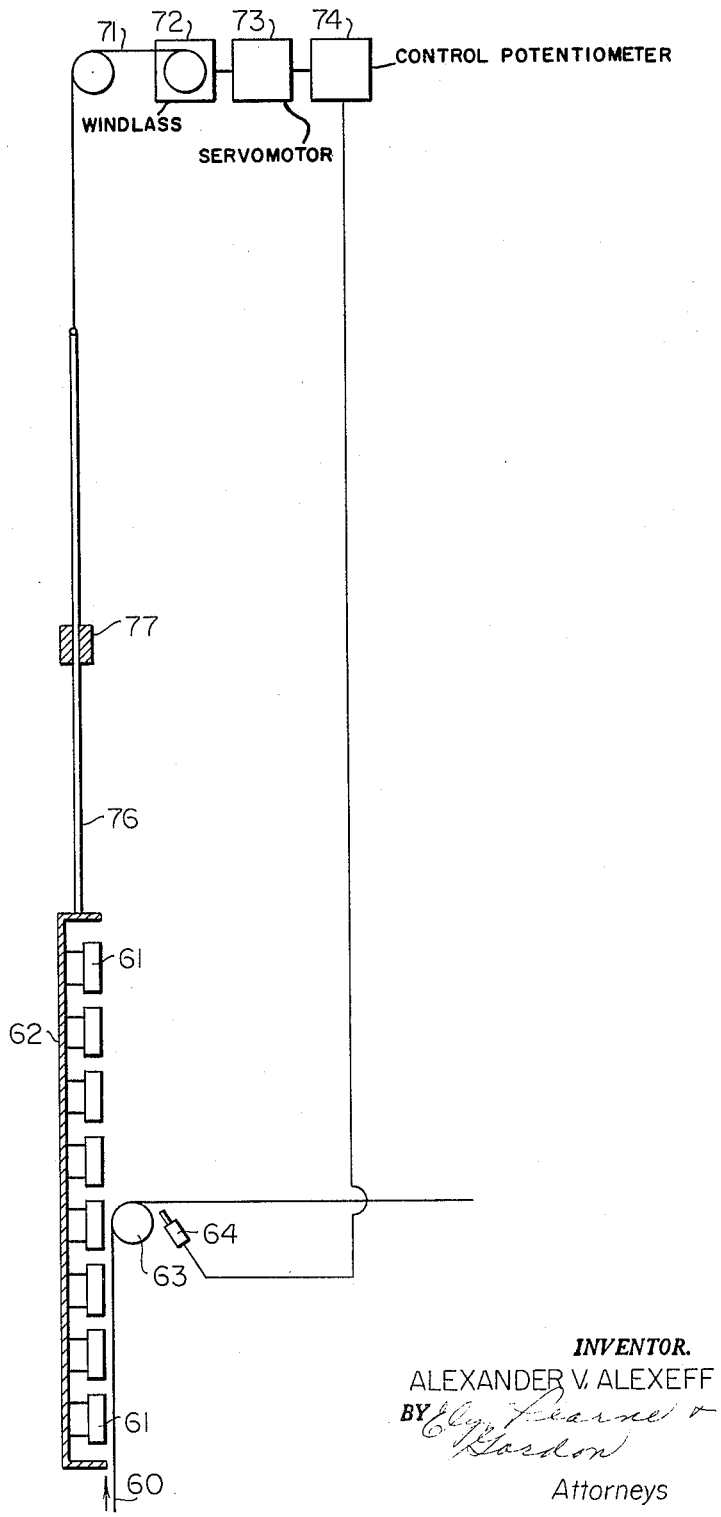
FIGURE 2 is a schematic side elevation, partly in cross-section, illustrating a variant of the invention where the heating element train is not endless but comprises a rigid array.

The variant aspect of the invention mentioned above near the conclusion of the opening remarks in this specification is llustrated in FIGURE 2. Such apparatus lacks some advantages of the endless heating apparatus described above; for example, the use of radiating black bodies which are heated at a separate heat input location outside the heat presentation area and the accomplishment of substantially absolute uniformity throughout the heat interface area by sweeping the heating elements therethrough so that heat input varies as a precise and regular function of variation of interface area. In some applications, such preciseness may not be necessary.

In FIGURE 2 there is shown an array or train of heating elements 61 rigidly supported on a housing 62 which may also cooperate with the treated strip to define a heating chamber. The housing 62 is rigidly suspended from a rod 76 which is guided in a bushing 77. The treated strip 60 is fed in the direction indicated by the arrow past a fixed roll 63 and a radiation pyrometer 64. The array of heating elements 61 is shown in an intermediate position in FIGURE 2, but is variable between the illustrated position and limiting end positions at which, respectively, the lowermost element 61 and the uppermost element 61 are positioned adjacent the roll 63.

Thus, it will be understood that the apparatus has a reach extending along the path of travel of the strip 60 from the train-and-strip-path juncture defined by the roll 63 to the end of the train or array of heating elements 61 represented by the lowermost heating element 61.

Means is provided for varying the distance between such end of the heating element train and the train-and-strip-path juncture, including a linkage 71 adapted to be taken up and let off by a windlass 72 which is adapted to be driven back and forth by a reversible servomotor 73, the total angular displacement of which is controlled by a conventional control potentiometer 74. The radiation pyrometer 64 is adapted to sense the temperature of the strip at the outfeed end of the heat treating station. Through the control potentiometer 74, the servomotor 73 is controlled in response to sensed temperature so that upon increase in temperature the array or train of heating elements 61 is raised and upon decrease in temperature, the array or train of heating elements 61 is lowered, the array normally hovering about the intermediate position shown in FIGURE 2.

Figure 3:
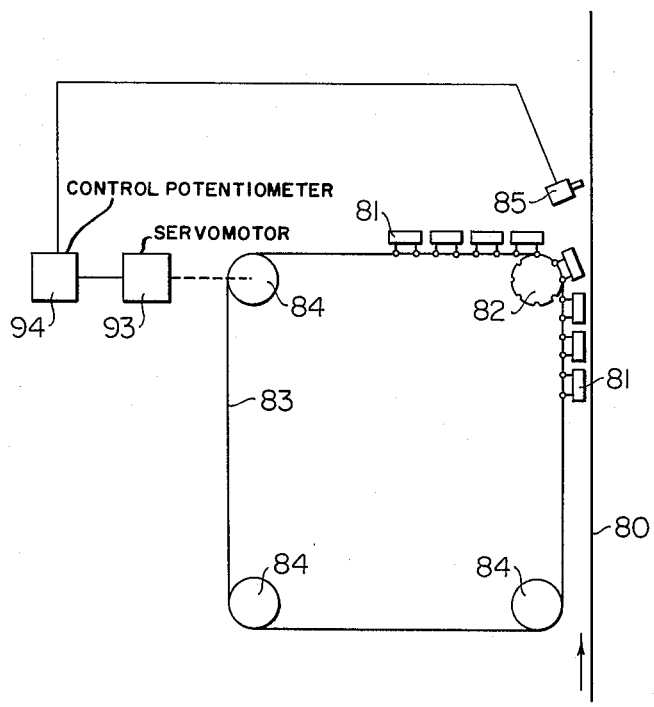
FIGURE 3 is a schematic view illustrating another example of the non-endless variant in which the train of heating elements is a flexible array.

The variant aspect of the invention is further illustrated in FIGURE 3 where there is shown an array or train of heating elements 81 capable of turning past a sprocket 82. The array of heating elements 81 is not endless but is limited in length, having a lowermost element 81 which represents the one end of the train. The passing strip 80 moves in the direction indicated by the arrow, and a train-and-strip-path juncture between the strip 80 and the array of heating elements 81 is defined by the sprocket 82. The array of train of heating elements 81 is moved back and forth by an endless linkage means 83 which passes around appropriate sheaves 84.

The strip 80 passes the radiation pyrometer 85. The array of heating elements 81 is shown in an intermediate position but is variable between this position and limiting end positions at which, respectively, the lowermost element 81 is positioned adjacent the right lower sheave 84 and is positioned adjacent the sprocket 82.

Thus it will be understood that the apparatus has a reach extending along the path of travel of the strip 80 from the train-and-strip-path juncture defined by the sprocket 82 to the end of the train or array of heating elements 81 represented by the lowermost heating element 81.

Means is provided for varying the distance between such end of the heating element train and the train-and-strip-path juncture, including a drive shaft for one of the sheaves 84 adapted to be turned forwardly or backwardly by a reversible sermomotor 93, the total angular displacement of which is controlled by a conventional control potentiometer 94. The radiation pyrometer 85 is adapted to sense the temperature of the strip at the outfeed end of the heat treating chamber. Through the control potentiometer 94, the servomotor 93 is controlled in response to sensed temperature so that upon increase in temperature the array of train of heating elements 81 is raised and upon decrease in temperature the array or train of heating elements 81 is lowered, the array normally hovering about the intermediate position shown in FIGURE 3.

This application is a continuation-in-part of my application Serial No. 100,751, filed April 4, 1961, now abandoned.

The above description of the invention should make it apparent that the invention may be embodied in many different specific strip processing arrangements. The present disclosure of the invention will suggest many possibilities for specific installations which are specially designed to meet particular conditions and operating requirements. The scope of the invention is not limited to details of the exemplary embodiments but is defined by the claim which follows.

What is claimed is:

Heating apparatus for treating a strip comprising first means for establishing a path along which the strip travels, at least one train of heating elements, second means for establishing a reach of said heating elements longitudinally coextending in the same direction as said path along a linear distance between an end of said reach and a train-and-strip-path juncture with respect to said path, said coextension establishing an area of presentation of said heating elements to said strip, means for varying said presentation area, said varying means comprising means for shifting at least one of said first and second means with respect to the other along said direction to vary said linear distance.

References Cited in the file of this patent
UNITED STATES PATENTS

| | | |
|---|---|---|
| 1,450,022 | Doyle | Mar. 27, 1923 |
| 2,127,956 | Helmer | Aug. 23, 1938 |
| 2,807,096 | Kullgren et al. | Sept. 24, 1957 |